United States Patent
Yamazaki et al.

(10) Patent No.: US 8,908,118 B2
(45) Date of Patent: Dec. 9, 2014

(54) LIQUID CRYSTAL DISPLAY DEVICE AND LIQUID CRYSTAL LENS

(75) Inventors: Hiroyuki Yamazaki, Chiba (JP); Sakae Ishii, Mobara (JP); Setsuo Kobayashi, Mobara (JP)

(73) Assignee: Japan Display Inc., Tokyo (JP)

( * ) Notice: Subject to any disclaimer, the term of this patent is extended or adjusted under 35 U.S.C. 154(b) by 63 days.

(21) Appl. No.: 13/609,365

(22) Filed: Sep. 11, 2012

(65) Prior Publication Data

US 2013/0077013 A1 Mar. 28, 2013

(30) Foreign Application Priority Data

Sep. 22, 2011 (JP) ................... 2011-206778

(51) Int. Cl.
 *G02F 1/1335* (2006.01)
 *G02F 1/1333* (2006.01)
 *G02F 1/13* (2006.01)
 *G02B 3/14* (2006.01)

(52) U.S. Cl.
 CPC ........................................ *G02B 3/14* (2013.01)
 USPC ................. 349/57; 349/58; 349/85; 349/122; 349/158; 349/200

(58) Field of Classification Search
 CPC .............. G02F 1/133526; G02F 2001/133368; G02F 2001/133302
 USPC ........................ 349/85, 57–58, 122, 158, 200
 See application file for complete search history.

(56) References Cited

U.S. PATENT DOCUMENTS

| | | |
|---|---|---|
| 6,278,500 B1 | 8/2001 | Ogawa et al. |
| 6,788,377 B1 * | 9/2004 | Ogawa et al. ................. 349/151 |
| 2001/0003363 A1 * | 6/2001 | Marien et al. ................. 252/589 |
| 2009/0046240 A1 * | 2/2009 | Bolton ........................... 349/158 |
| 2011/0069254 A1 * | 3/2011 | Takama et al. ................. 349/62 |

FOREIGN PATENT DOCUMENTS

| | | |
|---|---|---|
| JP | 8-50280 | 2/1996 |
| JP | 9-146078 | 6/1997 |
| JP | 09-325333 | 12/1997 |
| JP | 11-15012 | 1/1999 |
| JP | 2000-111890 | 4/2000 |
| JP | 2000-298269 | 10/2000 |
| JP | 2009-157302 | 7/2009 |
| JP | 2001-235621 | 8/2011 |
| JP | 2011-164427 | 8/2011 |
| WO | WO 2007/040127 | 4/2007 |

OTHER PUBLICATIONS

English translation of office action in corresponding foreign Japanese Application dated Jun. 24, 2014.

* cited by examiner

*Primary Examiner* — Nathanael R Briggs
(74) *Attorney, Agent, or Firm* — Antonelli, Terry, Stout & Kraus, LLP.

(57) ABSTRACT

In a liquid crystal display device enabling three-dimensional display using a liquid crystal lens, both mechanical strength and a liquid crystal lens effect are satisfied. The liquid crystal lens is bonded onto an upper polarizing plate of a liquid crystal display panel with a bonding material. The liquid crystal lens includes an upper substrate, a lower substrate and a liquid crystal layer sandwiched therebetween. The upper substrate of liquid crystal lens has a thickness larger than a total of the thickness of the lower substrate of the liquid crystal lens and the thickness of the liquid crystal display panel. Thereby, it is possible to realize a liquid crystal display device satisfying both the mechanical strength and liquid crystal lens effect.

6 Claims, 3 Drawing Sheets

LIQUID CRYSTAL DISPLAY DEVICE AND LIQUID CRYSTAL LENS

CLAIM OF PRIORITY

The present application claims priority from Japanese Patent Application JP 2011-206778 filed on Sep. 22, 2011, the content of which is hereby incorporated by reference into this application.

FIELD OF THE INVENTION

The present invention relates to a display device and a liquid crystal display device that enables three-dimensional display by using a liquid crystal lens.

BACKGROUND OF THE INVENTION

In a liquid crystal display panel, a display region is formed such that a TFT substrate over which pixel electrodes and thin-film transistors (TFTs), inter alia, are formed in a matrix and an opposing substrate over which color filters, inter alia, are formed in positions corresponding to the pixel electrodes in the TFT substrate are placed facing each other and liquid crystals are sandwiched between the TFT substrate and the opposing substrate. An image is produced by controlling light transmissibility through liquid crystal molecules pixel by pixel. Since liquid crystals are able to control only polarized light, light from a backlight is polarized by a lower polarizing plate before entering the TFT substrate and, after being subjected to control by a liquid crystal layer, the light is polarized again by an upper polarizing plate and goes out. Thus, outgoing light from the liquid crystal display panel is polarized light.

Various methods for converting an image produced by a liquid crystal display panel to a three-dimensional image have been proposed. Among them, a method of placing a liquid crystal lens on the top of a liquid crystal display panel attracts attention particularly for compact display devices, because special glasses are not needed for visual perception of a three-dimensional image and switching between a two-dimensional image and a three-dimensional image is possible.

Meanwhile, there is a requirement to reduce the entire thickness of a liquid crystal display device and, consequently, reducing the thickness of a liquid crystal display panel is pursued. Thinning the liquid crystal display panel is accomplished by abrading the TFT substrate and the opposing substrate. As a result, the mechanical strength of the liquid crystal display panel becomes problematic. Japanese Published Unexamined Patent Application No. Hei 9-146078 describes a structure in which, out of the TFT substrate and the opposing substrate, the thickness of the opposing substrate is made larger in order to maintain the strength of the layered liquid crystal display panel.

Meanwhile, Japanese Published Unexamined Patent Application No. Hei 11-15012 describes a structure of a laminated liquid crystal display device having three or more liquid crystal layers, in which the thicknesses of two outermost substrates are kept large, while the thicknesses of substrates sandwiching a liquid crystal layer between them are reduced, thereby decreasing vision disparity.

SUMMARY OF THE INVENTION

Even for a liquid crystal display device that displays in three dimensions using a liquid crystal lens, there is also a demand to reduce the entire thickness of the liquid crystal display device. Thus, in addition to reducing the liquid crystal display panel that displays an image, it is needed to reduce the thickness of the liquid crystal lens. If the thicknesses of the liquid crystal display panel and the liquid crystal lens are reduced, it is difficult to ensure a sufficient mechanical strength even if these layers are laminated.

A liquid crystal display device using a liquid crystal lens is especially prone to be influenced by mechanical strength, because weak mechanical strength influences both a gap variation in the liquid crystal display panel and a gap variation in the liquid crystal lens. In particular, the liquid crystal lens is susceptible to external stress, because it is situated outward and its liquid crystal layer has a larger thickness.

A challenge of the present invention is to reduce the entire thickness of a liquid crystal display device using a liquid crystal lens, while maintaining its mechanical strength, without degrading its image quality performance.

First means is as follows. There is provided a liquid crystal display device including a liquid crystal lens, a liquid crystal display panel, and a backlight. The liquid crystal lens includes an upper substrate, a lower substrate, and a liquid crystal layer sandwiched between the upper substrate and the lower substrate. The liquid crystal display panel includes a TFT substrate, an opposing substrate, a lower polarizing plate bonded onto the TFT substrate, an upper polarizing plate bonded onto the opposing substrate, and a liquid crystal layer sandwiched between the TFT substrate and the opposing substrate. The liquid crystal lens is bonded onto the upper polarizing plate of the liquid crystal display panel with a bonding material or an adhesive material. The upper substrate of the liquid crystal lens has a thickness larger than 0.2 mm and less than or equal to 1.5 mm and is thicker than the lower substrate of the liquid crystal lens.

In a more preferable structure of the liquid crystal display device, the thickness of the upper substrate of the liquid crystal lens is larger than a total of the thickness of the lower substrate of the liquid crystal lens and the thicknesses of a substrate which is situated upper and the upper polarizing plate of the liquid crystal display panel.

In a still more preferable structure of the liquid crystal display device, the thickness of the upper substrate of the liquid crystal lens is larger than a total of the thickness of the lower substrate of the liquid crystal lens and the entire thickness of the liquid crystal display panel.

According to another preferable means of the present invention, there is provided a liquid crystal display device including a liquid crystal lens, a liquid crystal display panel, and a backlight. The liquid crystal lens includes an upper substrate, a lower substrate, and a liquid crystal layer sandwiched between the upper substrate and the lower substrate. A protective film is bonded onto the upper substrate via a bonding material for protective film. The protective film has a function of blocking ultraviolet light with a wavelength of 340 nm or shorter. The liquid crystal display panel includes a TFT substrate, an opposing substrate, a lower polarizing plate bonded onto the TFT substrate, an upper polarizing plate bonded onto the opposing substrate, and a liquid crystal layer sandwiched between the TFT substrate and the opposing substrate. The liquid crystal lens is bonded onto the upper polarizing plate of the liquid crystal display panel with a bonding material or an adhesive material. Of the liquid crystal lens, the upper substrate including the protective film has a thickness larger than 0.2 mm and less than or equal to 1.5 mm and is thicker than the lower substrate of the liquid crystal lens.

In a more preferable aspect of this structure of the liquid crystal display device, the thickness of the upper substrate including the protective film, of the liquid crystal lens, is larger than a total of the thickness of the lower substrate of the liquid crystal lens and the thicknesses of a substrate which is situated upper and the upper polarizing plate of the liquid crystal display panel.

In a still more preferable aspect of this structure of the liquid crystal display device, the thickness of the upper substrate including the protective film, of the liquid crystal lens, is larger than a total of the thickness of the lower substrate of the liquid crystal lens and the entire thickness of the liquid crystal display panel.

A liquid crystal lens of the present invention includes an upper substrate, a lower substrate, and a liquid crystal layer sandwiched between the upper substrate and the lower substrate. The upper substrate of the liquid crystal lens has a thickness larger than 0.2 mm and less than or equal to 1.5 mm and is thicker than the lower substrate of the liquid crystal lens. More preferably, a protective film is bonded onto the upper substrate via a bonding material for protective film and the protective film blocks ultraviolet light with a wavelength of 340 nm or shorter.

According to the present invention, the thickness of the upper substrate of the liquid crystal lens is made larger than the thickness of the lower substrate. Thus, it is possible to increase the mechanical strength of the liquid crystal display device and to stably maintain the liquid crystal lens effect.

According to another aspect of the present invention, in addition to the above effect, the liquid crystal layer of the liquid crystal lens can be protected against ultraviolet light, because a protective film that blocks ultraviolet light with a wavelength of 340 nm or shorter is bonded onto the upper substrate via a bonding material for protective film.

DETAILED DESCRIPTION OF PREFERRED EMBODIMENTS

Figure 3:
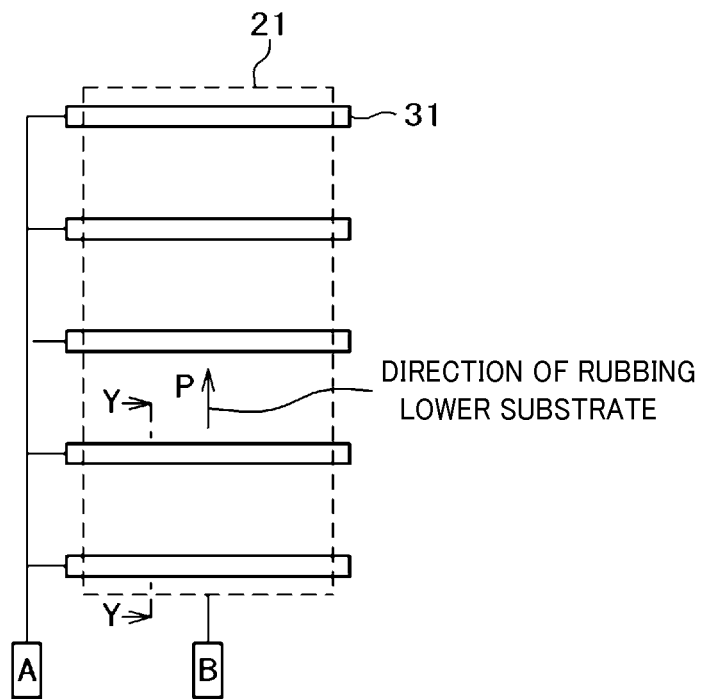
FIG. 3 is a plan view showing an arrangement of electrodes on a lower substrate and an upper substrate of a liquid crystal lens.
Figure 4:
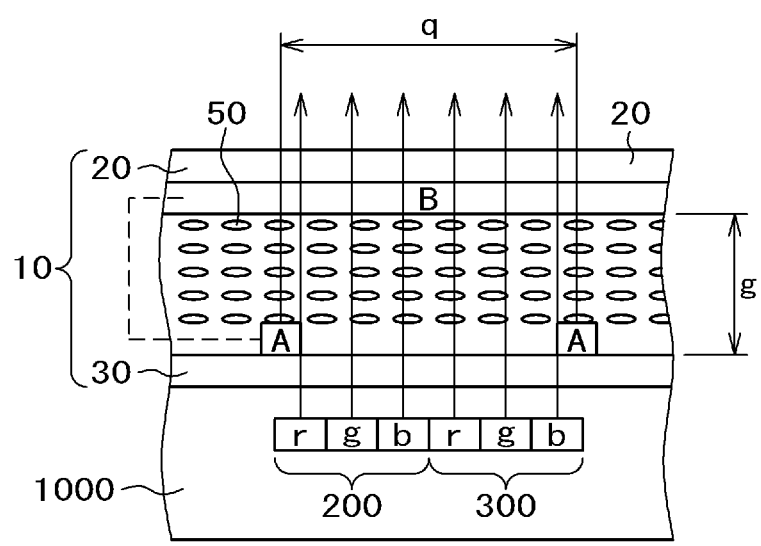
FIG. 4 is a schematic diagram showing how liquid crystal molecules are oriented in a state when no voltage is applied between the upper substrate and the lower substrate of the liquid crystal lens.
Figure 5:
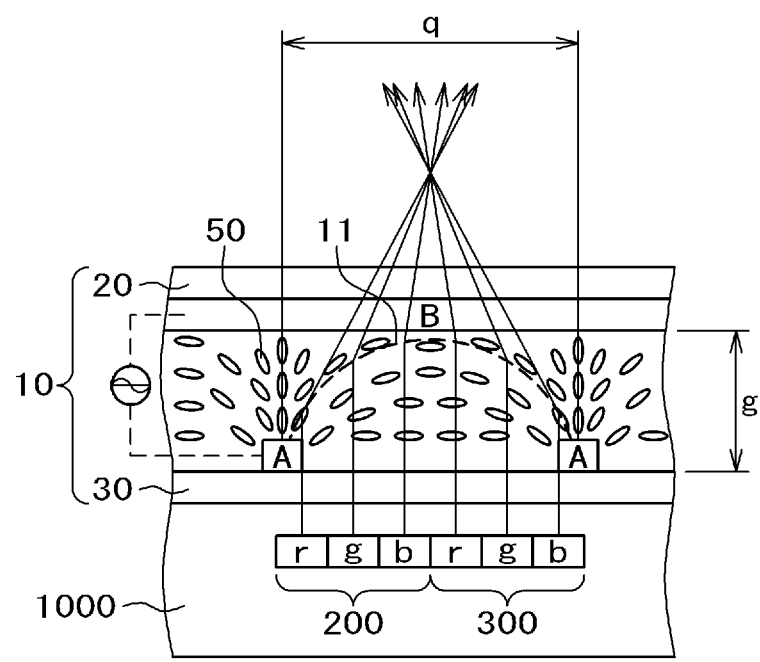
FIG. 5 is a schematic diagram showing how liquid crystals are oriented so as to form a liquid crystal lens, when a voltage is applied between the upper substrate and the lower substrate of the liquid crystal lens.

FIGS. 3, 4 and 5 outline a liquid crystal lens 10 and 3D display using the liquid crystal lens 10. In the present specification, 2D display means a two-dimensional display and 3D display means a three-dimensional display. An arrangement of electrodes shown in FIG. 3 represents one example of a liquid crystal lens and the present invention can also be applied to other arrangements of electrodes. The liquid crystal lens 10 has a structure in which liquid crystals are sandwiched between two substrates having electrodes formed thereon and this structure is the same as that of a liquid crystal display element. However, no polarizing plate is used, because the liquid crystal lens is not used to control a polarization direction of light, which is performed by a so-called liquid crystal display for displaying use.

FIG. 3 is a diagram outlining electrodes formed on two substrates sandwiching liquid crystals. Patterns depicted as horizontally long rectangles in sold lines are electrodes on a lower substrate 30. A vertical rectangle depicted in dashed lines is an electrode on an upper substrate 20. Vertical rectangles surrounding letters A and B denote electrode terminals for applying an external voltage and lines connecting the electrode terminals and the above electrodes on the substrates denote wiring. In the present specification, electrodes connected to an electrode terminal A may also be referred to as electrodes A and an electrode connected to an electrode terminal B may also be referred to as an electrode B. Here, the patterns on the upper and lower substrates 30 are not restrictive in essence and, thus, may be invertible. The electrode depicted in dashed lines, which covers at least the whole display area, is formed as a transparent electrode such as ITO, because it must be light transmissive.

An arrow marked P in FIG. 3 indicates a direction of rubbing the upper and lower substrates 30 and liquid crystals sandwiched between the substrates are aligned so that their long axes are oriented in this arrow direction in a state when no voltage is applied. FIG. 4 is a cross-sectional view through line Y-Y in FIG. 3. The electrodes on the lower substrate 30 are set up so that two pixels of an LCD located under the liquid crystal lens 10 are disposed between two electrodes A. Actually, a two-pixel pitch and an electrode pitch may not match exactly and may be designed appropriately according to an assumed viewpoint position.

FIG. 4 depicts an OFF state of the liquid crystal lens 10 when the upper and lower substrates are at the same voltage, that is, a state when no voltage is applied to the liquid crystals. At this time, all the liquid crystal molecules 50 are aligned in an orientation direction regulated by rubbing. Thus, the liquid crystal lens 10 is an optically uniform medium with respect to light transmitted through it and does not act on the light. That is, a two-dimensional image produced by the LCD for displaying use is output as is.

FIG. 5 depicts an ON state of the liquid crystal lens 10, a state where the orientation direction of the liquid crystals is varied by applying a voltage to the upper and lower electrodes of the liquid crystal lens 10. At this time, an AC voltage is applied to prevent the liquid crystals from deteriorating in a similar manner for an ordinary LCD. The electrode of the upper substrate 20 is a monolithic electrode and the lower electrodes are those localized in position. Thus, an electric field applied to the liquid crystals is not uniform in vertical and horizontal directions in the figure. The liquid crystal molecules are oriented in a radial fashion, as shown, along the electric field that is radial (parabolic) from the lower electrodes localized in position toward the upper monolithic electrode.

The liquid crystal molecules 50 have double refractions. Of light passing through the liquid crystal molecules and becoming polarized, components traveling in the longitudinal direction (long axis direction) of a molecule become extraordinary light with a high refractive index and components traveling perpendicularly to the above direction become ordinary light with a lower refractive index than the extraordinary light. Intermediate angles may be considered by resolution into an extraordinary light component and an ordinary light component in a manner analogous to vector resolution. Due to such double refractions, the liquid crystals are oriented as shown in FIG. 5.

If the polarization direction of incident light, i.e., outgoing light from the liquid crystal display panel 1000, is approximately parallel to the rubbing direction for the liquid crystal lens 10, a ratio between a high refractive index portion (extraordinary light portion) and a low refractive index portion varies from place to place when incident light goes through the liquid crystal lens 10. Here, the long axis direction of the liquid crystal molecules 50 aligns with the rubbing direction that determines the initial orientation of the liquid crystals, as shown in FIG. 4.

A dashed line depicting the boundary face of a convex lens 11 in FIG. 5 schematically illustrates the interface between the high refractive index portion and the low refractive index portion. In this way, the same effect as the convex lens is produced in the liquid crystal layer. When two pixels of the liquid crystal display panel 1000 are placed under this region providing the convex lens effect, light beams from a first pixel 200 divert their course to the right in the figure and light beams from a second pixel 300 divert their course to the left in the figure. In the first pixel 200 and the second pixel 300, r, g, and b stand for a red sub-pixel, a green sub-pixel, and a blue sub-pixel, respectively. The same will apply hereinafter. This liquid crystal lens 10 and the liquid crystal display panel 1000 are designed appropriately so as to display a signal for right eye and a signal for left eye in the first pixel 200 and the second pixel 300, respectively, and to direct the light beams from the first pixel 200 to the viewer's right eye and the light beams from the second pixel 200 to the viewer's left eye. Thereby, the viewer can perceive an image thus displayed as a 3D image.

In FIG. 4 and FIG. 5, the thickness of a liquid crystal layer 40 in the liquid crystal lens is, e.g., 20 to 50 μm and a distance between electrodes A in this case is, e.g., 150 to 200 μm. The thickness of the liquid crystal layer 40 in the liquid crystal lens 10 is larger than the thickness of the liquid crystal layer 40 in the liquid crystal display panel 1000. Deformation of the substrates of the liquid crystal lens 10 results in a decrease in the lens effect, in particular, a decrease in the lens effect due to orientation disorder around the beads or columnar spacers for maintaining the gap between the substrates of the liquid crystal lens.

The liquid crystal lens 10 is bonded by adhesion onto the liquid crystal display panel 1000 that produces an image. FIG. 4 and FIG. 5 are intended to illustrate the principle of the liquid crystal lens 10, but do not exactly show relative relations such as the thickness of each substrate and a gap between the substrates. A liquid crystal display device having the liquid crystal lens 10 according to the present invention will be described in detail in its entirety by way of examples provided below.

First Example

Figure 1:
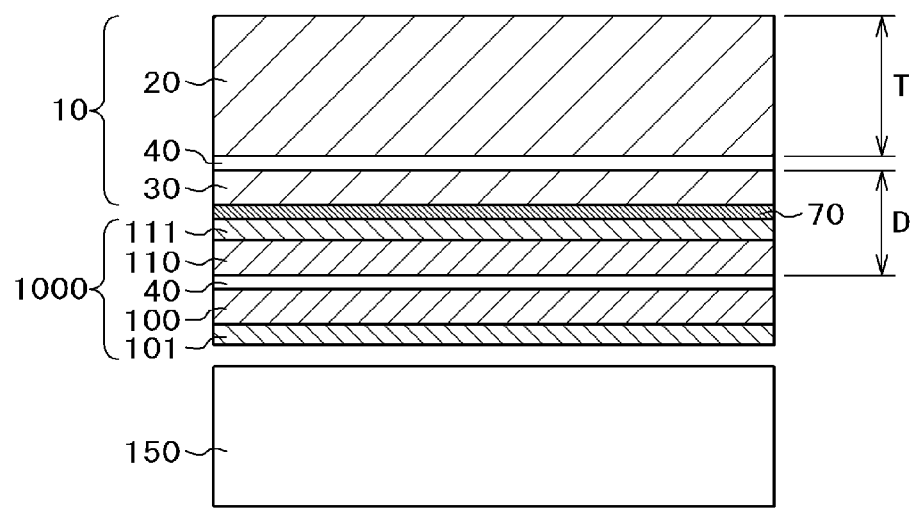
FIG. 1 is a cross-sectional diagram of a liquid crystal display device of First Example of the present invention.

FIG. 1 is a cross-sectional diagram of a liquid crystal display device including the liquid crystal lens 10 of First Example. In the present specification, a device including the liquid crystal lens 10, the liquid crystal display panel 1000, and a backlight 150 is referred to as a liquid crystal display device. In FIG. 1, the liquid crystal display panel 1000 is disposed on the top of the backlight 150 and the liquid crystal lens 10 is bonded onto the upper surface of the liquid crystal display panel 1000 with a bonding material 70. The backlight 150 in FIG. 1 is, for example, comprised of an LED light source, a light guide plate, a reflective sheet bonded onto the underside of the light guide plate, optical sheets such as a diffusion sheet and a prism sheet placed between the light guide plate and the liquid crystal display panel, and so forth.

The liquid crystal display panel 1000 has a structure in which a liquid crystal layer 40 is sandwiched between a TFT substrate 100 over which pixels with pixel electrodes are formed in a matrix and an opposing substrate 110 over which color filters are formed. A lower polarizing plate 101 is bonded onto the underside of the TFT substrate 100 and an upper polarizing plate 111 is bonded onto the upper surface of the opposing substrate 110.

The TFT substrate 100 and the opposing substrate 110 of the liquid crystal display panel 1000 are thinned by abrading their outer surface in order to reduce the thickness of the liquid crystal display panel 1000. More specifically, the TFT substrate 100 and the opposing substrate 110 which are initially approximately 0.5 mm thick are thinned to approximately 0.2 mm thick. The thickness of the lower polarizing plate 101 which is bonded onto the TFT substrate 100 and the thickness of the upper polarizing plate 111 which is bonded onto the opposing substrate 110 are approximately 0.13 mm. The thickness of the liquid crystal layer 10 in the liquid crystal display panel 1000 is several micrometers (μm). Thus, the entire thickness of the liquid crystal display panel 1000 is approximately 0.66 mm and its mechanical strength is weak.

The liquid crystal lens 10 is bonded onto such liquid crystal display panel 1000. The liquid crystal lens 10 is bonded onto the upper polarizing plate 111 of the liquid crystal display panel 1000 with an ultraviolet curable resin 70. The ultraviolet curable resin is initially in a liquid state and it is possible to use, for example, an acrylic resin including an acrylic oligomer by 27% to 30% and, besides, including an UV-reactive monomer, an additive for photo polymerization, etc. In this case, the bonding thickness can be in the order of several micrometers (μm) to 30 μm. Meanwhile, if sufficiently high bonding accuracy can be achieved with a precise bonding machine, an adhesive material may be used. In a case where an adhesive material is used, its thickness becomes approximately 30 μm.

Using the bonding material 70 such as one mentioned above, the liquid crystal lens 10 is bonded onto the liquid crystal display panel 1000. A feature of the present invention resides in the structure of the liquid crystal lens 10 bonded onto the liquid crystal display panel 1000. The liquid crystal lens 10 has the structure in which the liquid crystal layer 40 is sandwiched between the upper substrate 20 and the lower substrate 30. The thickness of the liquid crystal layer sandwiched between the upper substrate 20 and the lower substrate 30 is approximately 30 μm which is larger than the liquid crystal layer in the liquid crystal display panel 1000. It is a feature of the present invention that the thickness of the upper substrate 20 is larger than the thickness of the lower substrate 30 in the liquid crystal lens. For example, the thickness of the lower substrate 30 is 0.2 mm, whereas the thickness of the upper substrate 20 is 1 mm. By making the liquid crystal lens like this, it is possible to increase the mechanical strength of the liquid crystal lens 10.

Since the strength of a glass plate is proportional to a cube of the plate thickness, if a total thickness remains the same, making one substrate thicker than the other provides a larger mechanical strength than making the substrates having equal thickness. Accordingly, in the liquid crystal lens 10, by increasing the thickness of the upper substrate 20, not the lower substrate 30, the mechanical strength of the liquid crystal display device is improved.

As shown in FIG. 5, the lens that is formed by liquid crystals is designed assuming that light from the liquid crystal display panel 1000 enters the liquid crystal lens 10 at a right angle to the lens. The light from the liquid crystal display panel 1000 can be considered as the light emitted from the color filters of the opposing substrate 110. Hence, it will be expedient that the distance from the location of the color filters to the bottom of the liquid crystal layer 40 in the liquid crystal lens 10 or the upper surface of the lower substrate 30 is as small as possible.

In the present invention, the thickness of the lower substrate 30 of the liquid crystal lens 10 is made as small as possible and the thickness of the upper substrate 20 is made as thick as possible. Thereby, it is possible to maintain the mechanical strength of the liquid crystal lens 10, while maintaining the effect of the liquid crystal lens 10.

For comparison, concrete dimensions are provided below. Disregarding the thickness of the liquid crystal layer 40, the thickness of the liquid crystal display panel 1000 including the polarizing plates 101, 111 is 0.66 mm and the thickness of the lower substrate of the liquid crystal lens 10 is 0.2 mm. A total of these thicknesses is 0.86 mm. On the other hand, the upper substrate of the liquid crystal lens 10 is 1.0 mm thick. That is, in the structure shown in FIG. 1, the thickness of only the upper substrate 10 is larger than the total of the thicknesses of the liquid crystal display panel 1000 and the lower substrate 30 of the liquid crystal lens 10. According to this structure, it is possible to maintain the performance of the liquid crystal lens 10, while maintaining the mechanical strength sufficiently.

Furthermore, by making the thickness of the upper substrate 20 of the liquid crystal lens 10 larger than a total of the thickness of the lower substrate 30 of the liquid crystal lens 10 and the thicknesses of the opposing substrate 110 and the upper polarizing plate 111 of the liquid crystal display panel 1000, it is possible to maintain the performance of the liquid crystal lens 10 and to maintain the mechanical strength of the liquid crystal display device as a whole. From the perspective of the mechanical strength of the liquid crystal display device, it is desirable that the thickness of the upper substrate 20 of the liquid crystal lens 10 is larger than 0.2 mm. On the other hand, considering a demand to make the liquid crystal display device as thin as possible, it is desirable that the thickness of the upper substrate 20 is less than or equal to 1.5 mm.

Second Example

Figure 2:
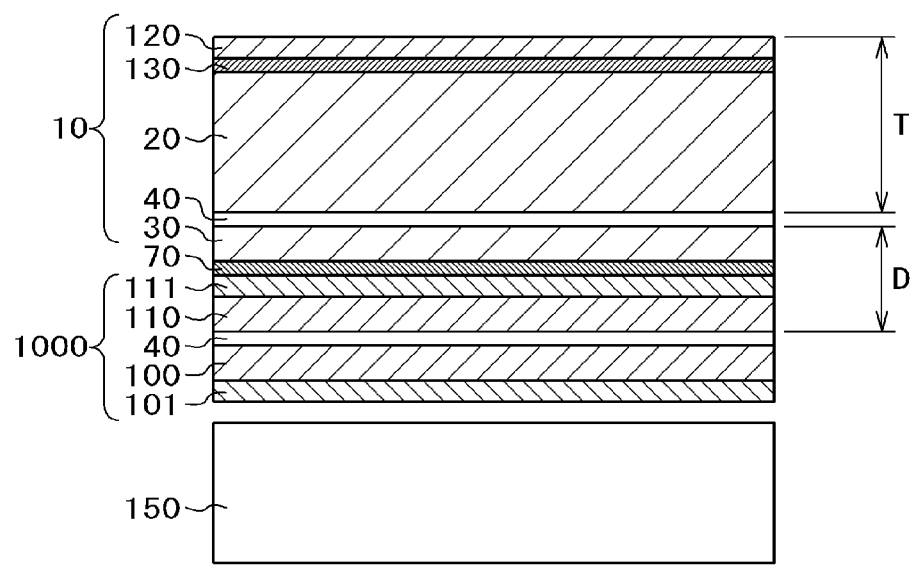
FIG. 2 is a cross-sectional diagram of a liquid crystal display device of Second Example of the present invention.

FIG. 2 is a cross-sectional diagram of a liquid crystal display device to illustrate Second Example of the present invention. In FIG. 2, the backlight 150, the liquid crystal display panel 1000, and the liquid crystal lens 10 up to the upper substrate 20 are the same as in FIG. 1 for First Example. The present example differs from First Example shown in FIG. 1 in that a protective film 120 is bonded onto the upper surface of the upper substrate 20 of the liquid crystal lens 10 via a bonding material for film 130. The thickness of the protective film 120 is approximately 0.1 mm and the thickness of the boding material 130 is approximately 0.025 mm. In this way, by bonding the protective film 120 onto the upper substrate 20 of the liquid crystal lens 10 via the bonding material for protective film 130, shattering of glass or the like is avoided even in case the upper substrate 20 has broken due to the effect of the bonding material 130.

In the case of the liquid crystal display panel 1000, the lower polarizing plate 101 is bonded onto the TFT substrate 100 and the upper polarizing plate 111 is bonded onto the opposing substrate 110. The polarizing plates 101, 111 have a function of blocking ultraviolet light. Thus, in the case of the liquid crystal display panel 1000, ultraviolet light from the backlight 150 is blocked by the lower polarizing plate 101 and external ultraviolet light is blocked by the upper polarizing plate 111. In this way, the liquid crystal layer 40 in the liquid crystal display panel 1000 is protected against ultraviolet light.

However, neither the upper polarizing plate 111 nor the lower polarizing plate 101 is formed in the liquid crystal lens 10. Hence, the liquid crystal layer 40 in the liquid crystal lens 10 has a risk of suffering deterioration by ultraviolet light. In the present example, the protective film 120 is bonded onto the upper substrate 20 of the liquid crystal lens 10 and this protective film 120 is provided with a function of blocking ultraviolet light with a wavelength of 340 nm or shorter. As the material for the protective film 120, a material such as PET, PMMA, and polycarbonate may be used and such material is provided with a function of blocking ultraviolet light.

In the case of the liquid crystal lens 10, the liquid crystal display panel 1000 lies under it and ultraviolet light from the backlight 150 is blocked by the polarizing plates 101, 111 disposed in the liquid crystal display panel 1000. Therefore, in the case of the liquid crystal lens 10, if the upper substrate 20 is provided with the function of blocking ultraviolet light, the liquid crystal layer 40 in the liquid crystal lens 10 can be protected against ultraviolet light.

In addition, even for the liquid crystal lens 10, when refractive index anisotropy is denoted by Δn and liquid crystal layer thickness is denoted by d, a value of Δn·d needs to be set to a predetermined value. In the liquid crystal lens, the thickness of the liquid crystal layer is 20 to 50 μm. On the other hand, in the case of the liquid crystal display panel 1000, the thickness of the liquid crystal layer 40 is several micrometers (μm). Hence, given that Δn·d is set to a predetermined value, Δn for the liquid crystal lens 10 is smaller than Δn in the case of the liquid crystal display panel 1000. In general, liquid crystals for which Δn is smaller are susceptible to deterioration by ultraviolet light. Therefore, as in the present example, overlaying the protective film 120 having the function of blocking ultraviolet light on the upper substrate 20 of the liquid crystal lens 10 is very important from the perspective of lifetime of the liquid crystal display device.

As the bonding material for protective film 130, an ultraviolet curable resin is used, as is the case for the bonding material 70 for bonding the liquid crystal display panel 1000 and the liquid crystal lens 10 together. Description about the material of this ultraviolet curable resin has been provided and, thus, repetitive description is omitted. In order to form the liquid crystal display device with the liquid crystal lens 10, like the one illustrated in FIG. 2, the protective film 120 is formed on the top of the liquid crystal lens 10 by using a resin that cures by ultraviolet light with a wavelength of 340 nm or longer, as an ultraviolet curable resin, and the liquid crystal lens 10 can be bonded onto the liquid crystal display panel 1000. Alternatively, after the liquid crystal display panel 1000 and the liquid crystal lens 10 are bonded together with an ultraviolet curable resin, the protective film may be bonded onto the liquid crystal lens 10 with a resin that cures by ultraviolet light with a wavelength of 340 nm or longer.

The structure up to the liquid crystal layer 40 of the liquid crystal lens 10 in FIG. 2 is the same as that shown in FIG. 1 for First Example. If a total of the thickness of the upper substrate 20 and the thickness of the protective film 120 bonded onto the upper substrate 20 is denoted by T, T is, for example, 1 mm. In this case, given that the film thickness is 0.1 mm and the bonding material for protective film is 0.025 mm thick, the thickness of the upper substrate made of glass is 0.875 mm. That is, the total thickness of the upper substrate and the protective film is the same as the thickness of the upper substrate for protection in First Example.

Thus, in the present example, the thickness of the upper substrate 20 including the protective film 120 is larger than that of the lower substrate 30. Moreover, the thickness of the upper substrate 20 including the protective film 120 is larger than a total of the thickness of the liquid crystal display panel 1000 and the thickness of the lower substrate 30 of the liquid crystal lens 10. According to this structure, it is possible to maintain the performance of the liquid crystal lens 10, while maintaining the mechanical strength sufficiently.

Furthermore, by making the thickness of the upper substrate 20 including the protective film 120, of the liquid crystal lens 10, larger than a total of the thickness of the lower substrate 30 of the liquid crystal lens 10 and the thicknesses of the opposing substrate 110 and the upper polarizing plate 111 of the liquid crystal display panel, it is possible to maintain the performance of the liquid crystal lens 10 and to maintain the mechanical strength of the liquid crystal display device as a whole. From the perspective of the mechanical strength of the liquid crystal display device, it is desirable that the thickness of the upper substrate 20 including the protective film 120, of the liquid crystal lens 10, is larger than 0.2 mm. On the other hand, considering a demand to make the liquid crystal display device as thin as possible, it is desirable that the thickness of the upper substrate 20 including the protective film 120 is less than or equal to 1.5 mm.

Although the upper substrate 20 of the liquid crystal lens 10 is assumed to be made of glass in the descriptions of First and Second Examples, it is not necessary that the upper substrate 20 is made of glass. For the material of the upper substrate 20, a material such as PET, PMMA, and polycarbonate can be used. For the material of the lower substrate 30 of the liquid crystal lens 10, likewise, a material other than glass can be used.

Although the upper substrate 20 is assumed to be made of glass in the description of First Example, by providing this glass with an effect of blocking ultraviolet light of 340 nm or shorter, the liquid crystal layer 40 of the liquid crystal lens 10 can be protected against ultraviolet light. Even in a case where a material such as PET, PMMA, and polycarbonate is used for the upper substrate 20, by providing such material with the effect of blocking ultraviolet light, the liquid crystal layer 40 of the liquid crystal lens 10 can likewise be protected against ultraviolet light.

Although the display device is assumed to be a liquid crystal display device in the descriptions of First and Second Examples, the liquid crystal lens of the present invention can also be applied to an organic EL display device. If an organic EL display panel is used as the image display device, no backlight is needed and the entire thickness of the device can be made thinner.

What is claimed is:

1. A liquid crystal display device comprising a liquid crystal lens, a liquid crystal display panel, and a backlight,
   wherein the liquid crystal lens includes an upper substrate, a lower substrate, and a liquid crystal layer sandwiched between the upper substrate and the lower substrate,
   wherein the liquid crystal display panel includes a TFT substrate, an opposing substrate, a lower polarizing plate bonded onto the TFT substrate, an upper polarizing plate bonded onto the opposing substrate, and a liquid crystal layer sandwiched between the TFT substrate and the opposing substrate,
   wherein the liquid crystal lens is bonded onto the upper polarizing plate of the liquid crystal display panel with a bonding material or an adhesive material,
   wherein the upper substrate of the liquid crystal lens has a thickness larger than 0.2 mm and less than or equal to 1.5 mm and is thicker than the lower substrate of the liquid crystal lens; and
   wherein the thickness of the upper substrate of the liquid crystal lens is larger than a total of a thickness of the lower substrate of the liquid crystal lens, a thickness of the opposing substrate of the liquid crystal display panel, and a thickness of the upper polarizing plate of the liquid crystal display panel.

2. The liquid crystal display device according to claim 1, wherein the thickness of the upper substrate of the liquid crystal lens is larger than a total of the thickness of the lower substrate of the liquid crystal lens and the entire thickness of the liquid crystal display panel.

3. The liquid crystal display device according to claim 1, wherein the upper polarizing plate of the liquid crystal display panel and the liquid crystal lens are bonded together with an ultraviolet curable resin.

4. A liquid crystal display device comprising a liquid crystal lens, a liquid crystal display panel, and a backlight,
   wherein the liquid crystal lens includes an upper substrate, a lower substrate, and a liquid crystal layer sandwiched between the upper substrate and the lower substrate,
   wherein a protective film is bonded onto the upper substrate of the liquid crystal lens via a bonding material for protective film, and
   wherein the protective film has a function of blocking ultraviolet light with a wavelength of 340 nm or shorter,
   wherein the liquid crystal display panel includes a TFT substrate, an opposing substrate, a lower polarizing plate bonded onto the TFT substrate, an upper polarizing plate bonded onto the opposing substrate, and a liquid crystal layer sandwiched between the TFT substrate and the opposing substrate,
   wherein the liquid crystal lens is bonded onto the upper polarizing plate of the liquid crystal display panel with a bonding material or an adhesive material, and
   wherein, of the liquid crystal lens, the upper substrate including the protective film has a thickness larger than 0.2 mm and less than or equal to 1.5 mm and is thicker than the lower substrate of the liquid crystal lens,
   wherein the thickness of the upper substrate including the protective film, of the liquid crystal lens, is larger than a total of a thickness of the lower substrate of the liquid crystal lens, a thickness of the opposing substrate of the liquid crystal display panel and a thickness of the upper polarizing plate of the liquid crystal display panel.

5. The liquid crystal display device according to claim 4, wherein the thickness of the upper substrate including the protective film, of the liquid crystal lens, is larger than a total of the thickness of the lower substrate of the liquid crystal lens and the entire thickness of the liquid crystal display panel.

6. The liquid crystal display device according to claim 4, wherein the upper polarizing plate of the liquid crystal display panel and the liquid crystal lens are bonded together with an ultraviolet curable resin.

* * * * *